US010290892B2

(12) United States Patent
Jung

(10) Patent No.: US 10,290,892 B2
(45) Date of Patent: May 14, 2019

(54) METHOD OF MANUFACTURING RECHARGEABLE BATTERY WITH CURVED SURFACE

(71) Applicant: Samsung SDI Co., Ltd., Yongin-si, Gyeonggi-do (KR)

(72) Inventor: Kang-Kook Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 703 days.

(21) Appl. No.: 14/944,129

(22) Filed: Nov. 17, 2015

(65) Prior Publication Data

US 2016/0141711 A1 May 19, 2016

(30) Foreign Application Priority Data

Nov. 19, 2014 (KR) .................. 10-2014-0161734

(51) Int. Cl.
*H01M 10/04* (2006.01)
*H01M 2/02* (2006.01)

(52) U.S. Cl.
CPC ..... *H01M 10/0431* (2013.01); *H01M 2/0202* (2013.01); *H01M 2002/0205* (2013.01); *H01M 2220/30* (2013.01)

(58) Field of Classification Search
None
See application file for complete search history.

(56) References Cited

U.S. PATENT DOCUMENTS

| 6,610,441 B2 | 8/2003 | Hensley et al. | |
| 9,379,410 B2* | 6/2016 | Thompson | H01M 10/0525 |
| 2006/0063067 A1 | 3/2006 | Kim | |
| 2012/0183825 A1* | 7/2012 | Lee | H01M 10/0431 |
| | | | 429/94 |
| 2015/0221919 A1 | 8/2015 | Tomoyoshi | |

(Continued)

FOREIGN PATENT DOCUMENTS

| CN | 102593406 A | 7/2012 |
| CN | 103811794 A | 5/2014 |
| CN | 103918103 A | 7/2014 |

(Continued)

OTHER PUBLICATIONS

U.S. Office Action dated May 17, 2018 for U.S. Appl. No. 14/944,044, and which is related to subject U.S. Appl. No. 14/944,129.

(Continued)

*Primary Examiner* — Sarah A. Slifka
(74) *Attorney, Agent, or Firm* — Knobbe Martens Olson & Bear LLP

(57) ABSTRACT

A method of manufacturing a rechargeable battery with a curved surface is disclosed. In one aspect, the method includes winding a plurality of electrodes and a separator together so as to form an electrode assembly, wherein the electrode assembly has first and second sides and two lateral ends connected to each other by the first and second sides, and wherein the first side is longer than the second side. The method also includes pressing the electrode assembly so as to bend the electrode assembly, electrically connecting the electrode assembly to a plurality of terminals, and accommodating the electrode assembly within a case.

20 Claims, 6 Drawing Sheets

(56) References Cited

U.S. PATENT DOCUMENTS

2016/0043355 A1* 2/2016 Byun .................. H01M 2/0207
429/163

FOREIGN PATENT DOCUMENTS

| JP | 2006-156049 A | | 6/2006 |
|----|---------------|---|--------|
| KR | 10-2007-0081549 A | | 8/2007 |
| KR | 10-2012-0082808 A | | 7/2012 |
| KR | 10-2013-0016746 A | | 2/2013 |
| KR | 10-2014-0019241 A | | 2/2014 |
| KR | 20160019314 | * | 2/2016 |

OTHER PUBLICATIONS

First Chinese Office Action dated Nov. 2, 2018 for Chinese Patent Application No. CN 201510802581.5 and which shares priority of Korean Patent Application No. KR 10-2014-0161734 with subject U.S. Appl. No. 14/944,129.

* cited by examiner

METHOD OF MANUFACTURING RECHARGEABLE BATTERY WITH CURVED SURFACE

CROSS-REFERENCE TO RELATED APPLICATION

This application claims priority to and the benefit of Korean Patent Application No. 10-2014-0161734 filed in the Korean Intellectual Property Office on Nov. 19, 2014, the entire contents of which are incorporated herein by reference.

This application relates to U.S. patent application entitled "Rechargeable Battery" Ser. No. 14/944,044, which is concurrently filed with this application and incorporated herein by reference in its entirety.

BACKGROUND

Field

The described technology generally relates to a method of manufacturing a rechargeable battery with a curved surface.

Description of the Related Technology

With the recent development of information technology, a variety of mobile devices such as smartphones, tablet PCs, etc. are being released at a rapid pace. These devises are getting thinner to improve design and convenience of use. Moreover, bendable rechargeable batteries have been suggested for application in different electronic equipment having different shapes.

SUMMARY OF CERTAIN INVENTIVE ASPECTS

One inventive aspect is a rechargeable battery which can reduce non-uniform stress generated within an electrode assembly.

Another aspect is a method of fabricating a rechargeable battery including an electrode assembly with a first front side and a second front side that connect lateral ends, the method including: forming an electrode assembly by winding electrodes together with a separator in such a way that the first front side is longer than the second front side; bending the electrode assembly by pressing; and electrically connecting the electrode assembly and terminals and assembling the electrode assembly into a case.

In the winding, the first front side can be made about 1.02 times to about 1.2 times longer than the second front side. In the winding, the electrodes and the separator can be wound on a mandrel including a first plate material and a second plate material which is thinner than the first plate material.

In the winding, the electrodes and the separator can be wound on a mandrel, the first plate material of which is about 1.01 times to about 1.2 times thicker than the second plate material. In the winding, the electrode assembly can be wound with the positive electrode, the negative electrode, and the separator fitted between the first plate material and the second plate material both having a polygonal cross-section.

In the winding, the electrode assembly can be wound with the positive electrode, the negative electrode, and the separator fitted between the first plate material and the second plate material both having a trapezoidal cross-section. In the winding, the first front side can be made convex and the second front side can be made concave.

In the bending, the lateral ends can be pressed toward a die with a curved surface, with the second front side being in contact with the die. In the assembling, the electrode assembly can be assembled into a pouch-shaped case, and the case can be sealed when the terminals are installed in such a way so as to be exposed to the outside of the case.

In the assembling, the case can include a first recess and a second recess and a flange portion formed around the first recess and the second recess, and the bottom of the first recess and the bottom of the second recess can be bent in an arc.

Another aspect is a method of manufacturing a rechargeable battery, the method comprising winding a plurality of electrodes and a separator together so as to form an electrode assembly, wherein the electrode assembly has first and second sides and two lateral ends connected to each other by the first and second sides, and wherein the first side is longer than the second side. The method also comprises pressing the electrode assembly so as to bend the electrode assembly, electrically connecting the electrode assembly to a plurality of terminals, and accommodating the electrode assembly within a case.

In the above method, the first side is about 1.02 times to about 1.2 times longer than the second side.

In the above method, in the winding, the electrodes and the separator are wound around a mandrel comprising a first plate and a second plate thinner than the first plate.

In the above method, the first plate is about 1.01 times to about 1.2 times thicker than the second plate.

In the above method, the separator is placed between the first and second plates, wherein each of the first and second plates has a polygonal cross-section.

In the above method, each of the first and second plates has a trapezoidal cross-section.

In the above method, the first side is convex and the second side is concave.

In the above method, in the pressing, the lateral ends are pressed toward a die with a curved surface such that the second side contacts the die.

In the above method, the case has a pouch shape, wherein the case is sealed so as to expose the terminals to the environment.

In the above method, the case has first and second recesses, each having bottom portions, and a flange portion formed around the first and second recesses, wherein the bottom portions are bent in the shape of an arc.

Another aspect is a method of manufacturing a rechargeable battery, the method comprising winding a plurality of electrodes and a separator around a mandrel so as to form an electrode assembly having first and second sides, both facing away from a center of the electrode assembly, and two lateral ends connected to each other by the first and second sides, wherein the first side is longer than the second side, wherein the mandrel comprises a first plate and a second plate facing each other, and wherein the first and second plates have different thicknesses. The method also comprises pressing the electrode assembly against a die so as to bend the electrode assembly, electrically connecting the electrode assembly to a plurality of terminals, and accommodating the electrode assembly within a case, wherein substantially the same amount of stress is applied to the first and second sides.

In the above method, the first side is about 1.02 times to about 1.2 times longer than the second side.

In the above method, the second plate is thinner than the first plate.

In the above method, the first plate is about 1.01 times to about 1.2 times thicker than the second plate.

In the above method, the separator is placed between the first and second plates, wherein each of the first and second plates has a polygonal cross-section.

In the above method, each of the first and second plates has a trapezoidal cross-section.

In the above method, the first side is convex and the second side is concave.

In the above method, the die has a curved surface, wherein the second side contacts the die.

In the above method, the case has a pouch shape, wherein the case is sealed so as to expose the terminals to the environment.

In the above method, the case has first and second recesses, each having bottom portions, and a flange portion surrounding the first and second recesses, wherein the bottom portions are bent in the shape of an arc.

DETAILED DESCRIPTION OF CERTAIN INVENTIVE EMBODIMENTS

Figure 1:
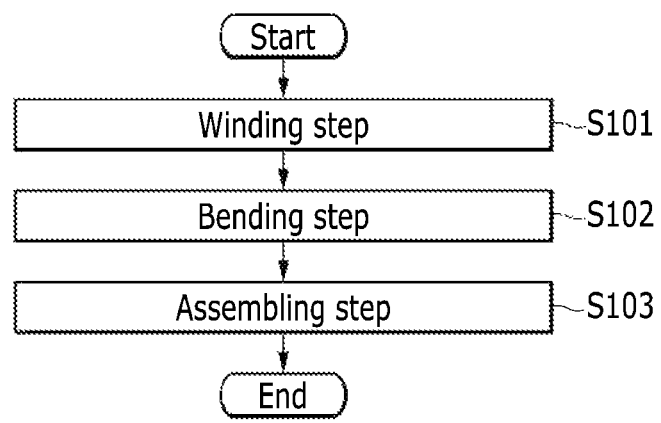
FIG. 1 is a flowchart for explaining a method of fabricating a rechargeable battery according to an exemplary embodiment.

If a rechargeable battery is bent in the shape of an arc, a convex surface formed by the bend is subjected to higher stress than a concave surface. Accordingly, the stress can result in reduced life of the rechargeable battery.

Hereinafter, embodiments will be described in detail with reference to the accompanying drawings so that one of ordinary skill in the art can easily realize the described technology. However, the described technology can be embodied in many different forms and should not be construed as being limited to the embodiments set forth herein. Like reference numerals denote like elements throughout the specification and the drawings. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
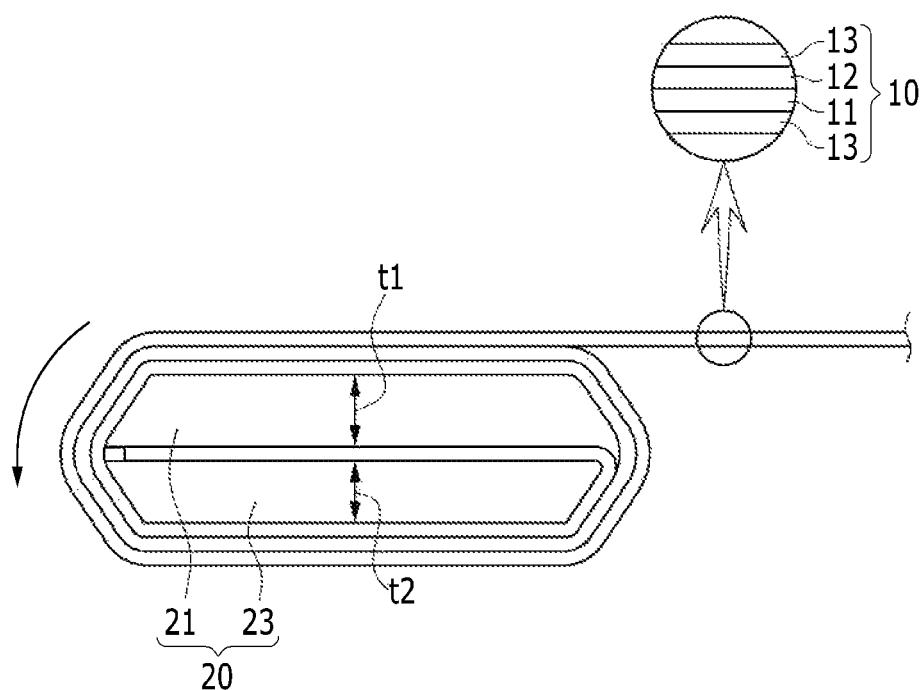
FIG. 2 is a view showing a process of winding electrodes using a mandrel according to an exemplary embodiment.

FIG. 1 is a flowchart for explaining a method of fabricating a rechargeable battery according to an exemplary embodiment. FIG. 2 is a view showing a process of winding electrodes using a mandrel according to an exemplary embodiment. Depending on the embodiment, additional states can be added, others removed, or the order of the states changed in FIG. 1.

Referring to FIG. 1 and FIG. 2, the method of fabricating a rechargeable battery includes a winding step S101 for forming an electrode assembly 10 by winding electrodes together with a separator 13. The method also includes a bending step S102 for bending the electrode assembly 10 by pressing and an assembling step S103 for electrically connecting the electrode assembly 10 to terminals (see FIG. 5) and assembling or accommodating the electrode assembly 10 into a case 40 (see FIG. 5).

In the winding step S101, electrodes and the separator 13 are wound around a mandrel 20 including a first plate material or first plate 21 and a second plate material or second plate 23. The electrodes include a positive electrode 11 and a negative electrode 12. The electrode assembly 10 includes the positive electrode 11, the negative electrode 12, and the separator 13 interposed between the positive and negative electrodes 11 and 12. The positive electrode 11, the negative electrode 12, and the separator 13 together have the shape of a longitudinally extending belt. By winding them around the outer surface of the mandrel 20, a jelly-roll shaped electrode assembly 10 is formed.

The mandrel 20 includes the first and second plate materials 21 and 23. The first plate material 21 has a thickness t1 greater than a thickness t2 of the second plate material 23. The first plate material 21 can be about 1.01 times to about 1.2 times thicker than the second plate material 23. However, depending on embodiments, the first plate material 21 can be less than about 1.01 times or greater than about 1.2 times than the second plate material 23. The first and second plate material 21 and 23 have a polygonal cross-section. The first and second plate material 21 and 23 can have a trapezoidal cross-section.

The first and second plate materials 21 and 23 are placed in such a way that their widest sides face each other, and the first and second plate material 21 and 23 are spaced apart from each other by a gap between them. In the winding step S101, the electrode assembly 10 is wound by rotating the mandrel 20 with the positive electrode 12, the negative electrode 12, and the separator 13 fitted between the first plate and second plate material 21 and 23.

Figure 3:
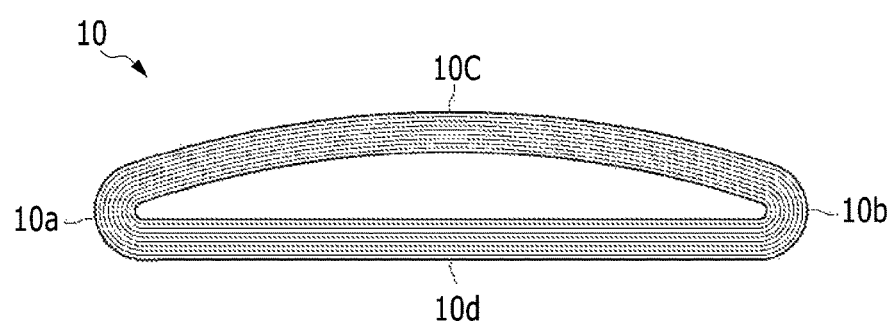
FIG. 3 is a view showing an electrode assembly wound according to an exemplary embodiment.

As shown in FIG. 3, a jelly-roll shaped electrode assembly is wound during the winding step. The electrode assembly 10 includes two lateral ends 10a and 10b, and first and second front sides or first and second sides 10c and 10d that connect the lateral ends 10a and 10b. As used herein, the lateral ends 10a and 10b refer to the outermost parts of the wound electrode assembly 10 in a lateral direction. The first and second sides 10c and 10d face away from each other and away from a center of the electrode assembly 10.

As stated above, according to the present exemplary embodiment, the electrode assembly 10 is wound around the mandrel 20 including the plate materials 21 and 23 of different thicknesses. Thus, in the winding step S101, the first front side 10c is longer than the second front side 10d. In the winding step S101, the first front side 10c can be about 1.02 times to about 1.2 times longer than the second front side 10d. However, depending on embodiments, the first front side 10c can be less than about 1.02 times or greater than about 1.2 times than the second front side 10d.

The ratio in length between the first and second front sides 10c and 10d can be variously set depending on the degree of bending of the electrode assembly 10. As in the first exemplary embodiment, if the first front side 10c is longer than the second front side 10d, the same or similar level of stress can be applied to the first and second front sides 10c and 10d even if the electrode assembly 10 is bent.

Figure 4:
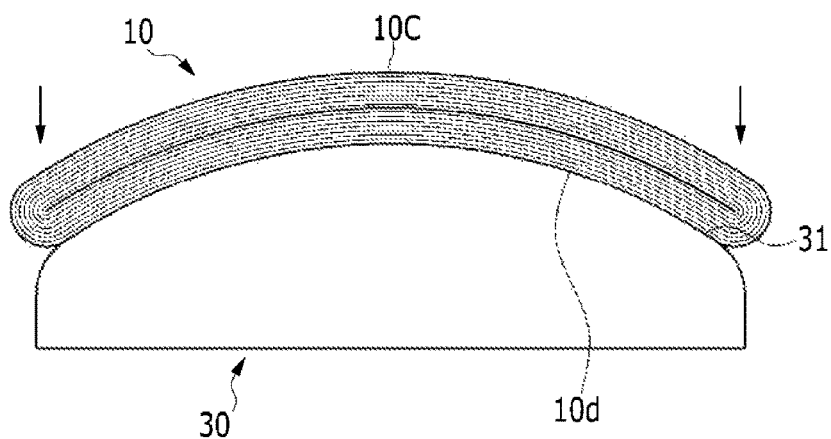
FIG. 4 is a view showing a process of bending an electrode assembly according to an exemplary embodiment.

FIG. 4 is a view showing a process of bending an electrode assembly according to an exemplary embodiment.

Referring to FIG. 4, in the bending step S102, the electrode assembly 10 is bent in the shape of an arc by pressing the lateral ends 10a and 10b toward a die 30 with a curved surface 31, with the second front side 10d being in contact with the die 30. Accordingly, in the bending step S102, the first front side 10c can be convex and the second front side 10d can be concave.

Figure 5:
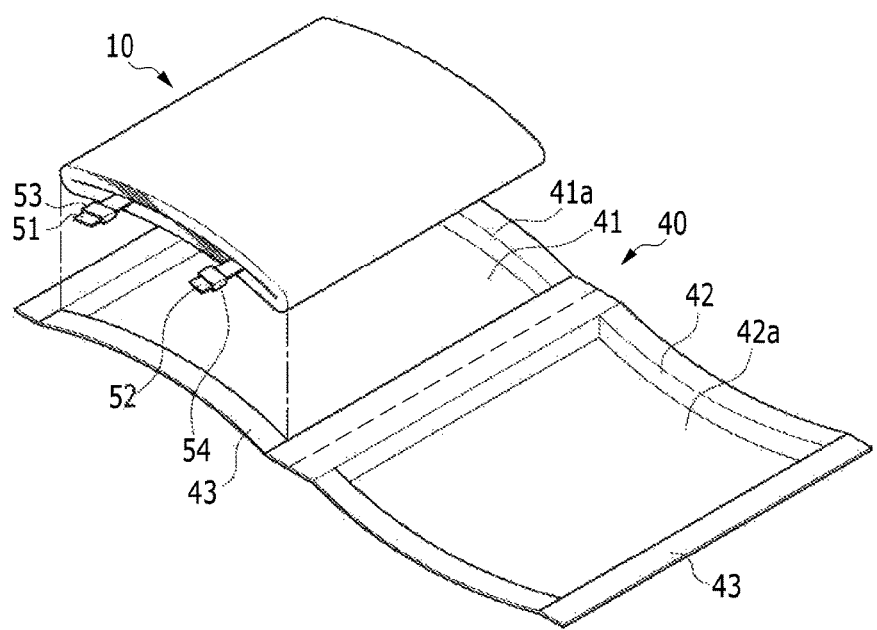
FIG. 5 is a view showing a process of assembling a rechargeable battery according to an exemplary embodiment.

FIG. 5 is a view showing a process of assembling a rechargeable battery according to an exemplary embodiment.

Referring to FIG. 5, in the assembling step S103, the electrode assembly 10 and the terminals 51 and 52 are electrically connected, the electrode assembly 10 is inserted into the case 40, and the case 40 is sealed. The case 40 is shaped like a pouch, and includes two recesses 41 and 42 and a flange portion 43 formed on the outer side of the recesses 41 and 42.

Although the present exemplary embodiment has been described by taking the pouch-shaped case 40 as an example, the described technology is not limited to this example, and the case 40 can be formed of a metal. For a case formed of a metal, an electrode assembly is inserted into the case, and a cap plate with terminals installed on it is welded to the case.

In the assembling step S103, the case 40 is sealed by heat-sealing the flange portion 43, after the terminals 51 and 52 are installed so as to be exposed on the outside of the case 40. The terminal 51 is welded to the positive electrode 11, and the terminal 52 can be welded to the negative electrode 12. Sealing members 53 and 54 for insulation are wound on the terminals 51 and 52.

Figure 6:
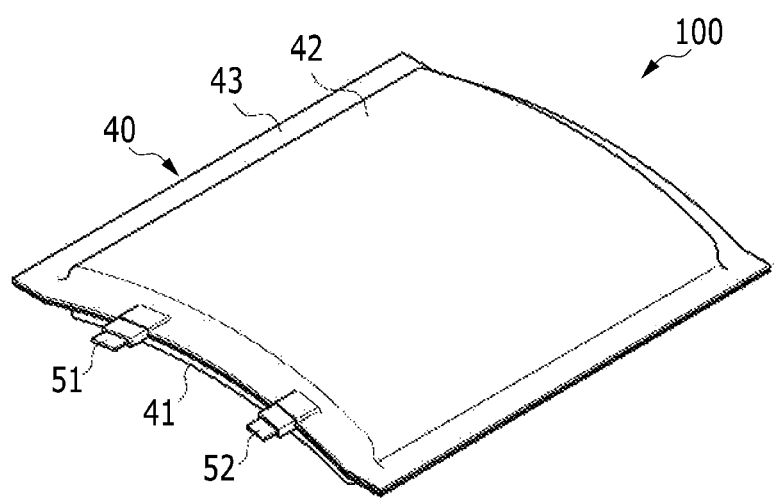
FIG. 6 is a perspective view of a rechargeable battery fabricated according to an exemplary embodiment.

The bottom 41a of the first recess 41 and the bottom 42a of the second recess 42 are bent in the shape of an arc, and accordingly, the rechargeable battery 100 is likewise bent in the shape of an arc as shown in FIG. 6.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a rechargeable battery, the method comprising:
    winding a plurality of electrodes and a separator together so as to form an electrode assembly, wherein the electrode assembly has first and second sides and two lateral ends connected to each other by the first and second sides, and wherein the first side is longer than the second side;
    pressing the electrode assembly so as to bend the electrode assembly;
    electrically connecting the electrode assembly to a plurality of terminals; and
    accommodating the electrode assembly within a case.

2. The method of claim 1, wherein the first side is about 1.02 times to about 1.2 times longer than the second side.

3. The method of claim 1, wherein, in the winding, the electrodes and the separator are wound around a mandrel comprising a first plate and a second plate thinner than the first plate.

4. The method of claim 3, wherein the first plate is about 1.01 times to about 1.2 times thicker than the second plate.

5. The method of claim 4, wherein the separator is placed between the first and second plates, and wherein each of the first and second plates has a polygonal cross-section.

6. The method of claim 5, wherein each of the first and second plates has a trapezoidal cross-section.

7. The method of claim 1, wherein the first side is convex and the second side is concave.

8. The method of claim 7, wherein, in the pressing, the lateral ends are pressed toward a die with a curved surface such that the second side contacts the die.

9. The method of claim 1, wherein the case has a pouch shape, and wherein the case is sealed so as to expose the terminals to the environment.

10. The method of claim 9, wherein the case has first and second recesses, each having bottom portions, and a flange portion formed around the first and second recesses, and wherein the bottom portions are bent in the shape of an arc.

11. A method of manufacturing a rechargeable battery, the method comprising:
    winding a plurality of electrodes and a separator around a mandrel so as to form an electrode assembly having first and second sides, both facing away from a center of the electrode assembly, and two lateral ends connected to each other by the first and second sides, wherein the first side is longer than the second side, wherein the mandrel comprises a first plate and a second plate facing each other, and wherein the first and second plates have different thicknesses;
    pressing the electrode assembly against a die so as to bend the electrode assembly;
    electrically connecting the electrode assembly to a plurality of terminals; and
    accommodating the electrode assembly within a case, wherein substantially the same amount of stress is applied to the first and second sides.

12. The method of claim 11, wherein the first side is about 1.02 times to about 1.2 times longer than the second side.

13. The method of claim 11, wherein the second plate is thinner than the first plate.

14. The method of claim 13, wherein the first plate is about 1.01 times to about 1.2 times thicker than the second plate.

15. The method of claim 14, wherein the separator is placed between the first and second plates, and wherein each of the first and second plates has a polygonal cross-section.

16. The method of claim 15, wherein each of the first and second plates has a trapezoidal cross-section.

17. The method of claim 11, wherein the first side is convex and the second side is concave.

18. The method of claim 17, wherein the die has a curved surface, and wherein the second side contacts the die.

19. The method of claim 11, wherein the case has a pouch shape, and wherein the case is sealed so as to expose the terminals to the environment.

20. The method of claim 19, wherein the case has first and second recesses, each having bottom portions, and a flange portion surrounding the first and second recesses, and wherein the bottom portions are bent in the shape of an arc.

* * * * *